(12) United States Patent
Gur et al.

(10) Patent No.: US 10,534,464 B2
(45) Date of Patent: Jan. 14, 2020

(54) SELECTIVE SCANNING FOR TOUCH-SENSITIVE DISPLAY DEVICE

(71) Applicant: Microsoft Technology Licensing, LLC, Redmond, WA (US)

(72) Inventors: Arie Yehuda Gur, Kiryat Ono (IL); Zohar Nagola, Tel Aviv (IL)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 15/969,426

(22) Filed: May 2, 2018

(65) Prior Publication Data
US 2019/0102014 A1 Apr. 4, 2019

Related U.S. Application Data

(60) Provisional application No. 62/567,640, filed on Oct. 3, 2017.

(51) Int. Cl.
*G06F 3/0354* (2013.01)
*G06F 3/041* (2006.01)
*G06F 3/044* (2006.01)

(52) U.S. Cl.
CPC ........ *G06F 3/0412* (2013.01); *G06F 3/03545* (2013.01); *G06F 3/0416* (2013.01); *G06F 3/044* (2013.01); *G06F 2203/04112* (2013.01)

(58) Field of Classification Search
None
See application file for complete search history.

(56) References Cited

U.S. PATENT DOCUMENTS

2010/0097342 A1* 4/2010 Simmons ............ G06F 3/0416 345/174
2012/0223894 A1 9/2012 Zhao et al.
2012/0327042 A1* 12/2012 Harley ............ G06F 3/03545 345/179

(Continued)

FOREIGN PATENT DOCUMENTS

EP 2256606 A2 12/2010
WO 2014177726 A2 11/2014

OTHER PUBLICATIONS

"International Search Report and Written Opinion Issued in PCT Application No. PCT/US18/052769", dated Nov. 21, 2018, 13 Pages.

*Primary Examiner* — Kent W Chang
*Assistant Examiner* — Benjamin Morales
(74) *Attorney, Agent, or Firm* — Alleman Hall Creaseman & Tuttle LLP

(57) ABSTRACT

Detecting touch input includes, over a series of touch-sensing time frames, interpreting electrical conditions of display electrodes of a touch-sensitive display device to estimate frame-by-frame positions of two or more stylus electrodes of an active stylus. Based on the estimated frame-by-frame positions, future positions of each of the two or more stylus electrodes during a future touch-sensing time frame are predicted. Regions of interest on the touch-sensitive display device are identified, each region of interest including a plurality of display electrodes surrounding the predicted future position of a stylus electrode of the two or more stylus electrodes. During the future touch-sensing time frame, display electrodes in the regions of interest are selectively scanned.

18 Claims, 8 Drawing Sheets

(56) References Cited

U.S. PATENT DOCUMENTS

| | | | |
|---|---|---|---|
| 2013/0044078 A1 | 2/2013 | Hallenberg et al. | |
| 2013/0176274 A1 | 7/2013 | Sobel et al. | |
| 2017/0068337 A1* | 3/2017 | Bhandari | G06F 3/044 |
| 2017/0068344 A1* | 3/2017 | Bhandari | G06F 3/03545 |
| 2017/0249028 A1* | 8/2017 | Marshall | G06F 3/03545 |
| 2017/0344174 A1* | 11/2017 | Pant | G06F 3/0416 |
| 2017/0357338 A1* | 12/2017 | Bell | G06F 3/03545 |
| 2017/0357538 A1* | 12/2017 | Zarkesh | H04L 69/04 |
| 2018/0143703 A1* | 5/2018 | Fleck | G06F 3/0346 |
| 2018/0307332 A1* | 10/2018 | Stone | G06F 3/03545 |

* cited by examiner

SELECTIVE SCANNING FOR TOUCH-SENSITIVE DISPLAY DEVICE

CROSS REFERENCE TO RELATED APPLICATIONS

This application claims priority to U.S. Provisional Patent Application Ser. No. 62/567,640, filed Oct. 3, 2017, the entirety of which is hereby incorporated herein by reference for all purposes.

BACKGROUND

Touch-sensitive display devices allow users to interact with computers using fingers, passive styli, active styli, and other input objects. The touch-sensitive display device may detect a touch event each time an input object touches or comes into close proximity with a touch sensor of the touch-sensitive display device. The touch sensor typically includes a plurality of touch-sensing electrodes distributed across the touch sensor to enable capacitance measurements at specific two-dimensional locations (e.g., given by X and Y coordinates). A touch event may therefore be interpreted by the touch-sensitive display device as a user input at a particular two-dimensional location relative to the touch-sensitive display device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Detecting touch input includes, over a series of touch-sensing time frames, interpreting electrical conditions of display electrodes of a touch-sensitive display device to estimate frame-by-frame positions of two or more stylus electrodes of an active stylus. Based on the estimated frame-by-frame positions, future positions of each of the two or more stylus electrodes during a future touch-sensing time frame are predicted. Regions of interest on the touch-sensitive display device are identified, each region of interest including a plurality of display electrodes surrounding the predicted future position of a stylus electrode of the two or more stylus electrodes. During the future touch-sensing time frame, display electrodes in the regions of interest are selectively scanned.

DETAILED DESCRIPTION

Figure 1:
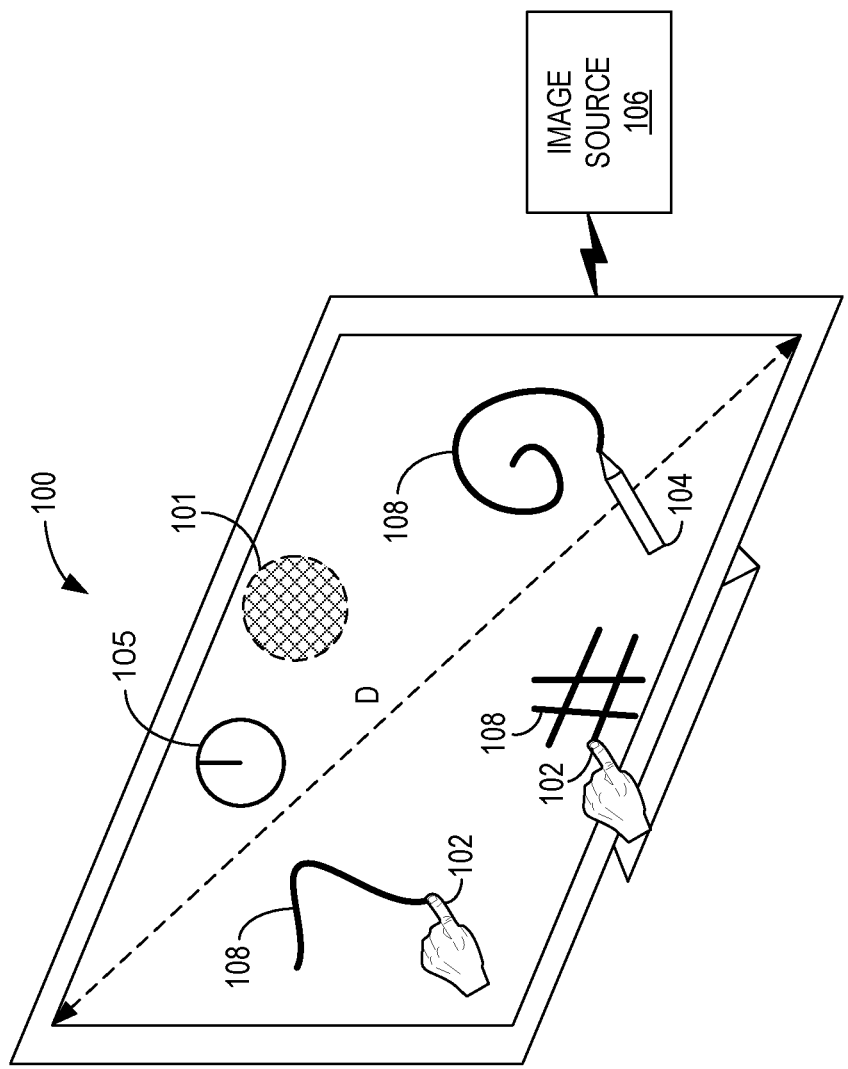
FIG. 1 schematically depicts an example display device accepting touch input from multiple input objects.

In typical touch-sensitive display devices, during a given touch-sensing frame, many if not all of the display electrodes of the touch-sensitive display device are either driven with an excitation signal or scanned to identify the location of a touch input. While this can help to ensure that all touch inputs are detected regardless of their position on the display panel, scanning/driving display device electrodes takes time and consumes processing resources. For the sake of clarity, as used herein, "scanning" a display electrode may refer to driving the display electrode with a display excitation signal, receiving a stylus excitation signal applied to a stylus electrode, and/or exchanging data with an active stylus via driving of display electrodes.

Resource consumption associated with input detection can be higher with active input objects (e.g., active styli), particularly when multiple electrodes are employed. For example, active styli often benefit from having more than one electrode in a single operative end (e.g., stylus tip). Tracking the relative positions of multiple electrodes of an active stylus simultaneously or sequentially can be used to determine, for example, when the active stylus is tilted or rotated. In many cases, the positions of the two or more electrodes are tracked substantially independently. In other words, from the perspective of the touch-sensitive display device, the two or more stylus electrodes are treated as if there is no inherent structural or spatial relationship between the two or more stylus electrodes, thereby requiring large spatial scanning or otherwise increasing the tracking burden at the display device, for example by requiring the display device to work through a large set of potential position, tilt, and twist solutions for an observed set of capacitance measurements.

Accordingly, the present disclosure contemplates selectively scanning regions of a touch-sensitive display based on predicted locations of stylus electrodes of an active stylus. Over a series of touch-sensing frames, the frame-by-frame positions of the stylus electrodes are estimated and used to predict future positions of the stylus electrodes during a future touch-sensing time frame. Based on these predicted positions, the portions of the touch-sensitive display that are actively scanned can be limited to regions that correspond to the predicted future positions of the stylus electrodes. In this manner, both electrical power and processing resources of the touch-sensitive display device can be conserved without hindering the ability to detect touch input provided by an input object.

Though the present disclosure primarily focuses on tracking the relative positions of electrodes of an active stylus, it will be understood that any of a variety of input objects can be used with a touch-sensitive display device. Further, it will be understood that the techniques described herein may be applied regardless of the specific input object used. For example, the techniques described herein may be applied to an active stylus having any suitable number of stylus electrodes, passive stylus, external control (e.g., user-manipulable electrostatic dial), and/or any other suitable input object, as well as human fingers.

FIG. 1 shows a touch sensitive display device 100 including a touch sensor 101. Display device 100 may have any suitable form factor (e.g., smartphone, wearable device, tablet, laptop, computer monitor, large-format freestanding or wall-mounted display, etc.), and may have any suitable size.

Display device 100 may be configured to sense one or more sources of input provided by an input object. Nonlimiting examples of input objects include human finger 102, stylus 104 (which may be an active or passive stylus), and electrostatic dial 105. It will be understood that any suitable source of input may be used in connection with display device 100. Further, display device 100 may be configured to receive input from input objects in contact with the display device 100 and input objects not in contact with the display device 100 (e.g., input objects that hover proximate to a surface of the display). "Touch input" as used herein refers to both types of input. In some examples, display device 100 may be configured to receive input from two or more sources simultaneously, in which case the display device may be referred to as a multi-touch display device.

Display device 100 may be operatively coupled to an image source 106, which may be, for example, a computing device external to, or housed within, the display device 100. Image source 106 may receive input from display device 100, process the input, and in response generate appropriate graphical output 108 for the display device 100. In this way, display device 100 may provide a natural paradigm for interacting with a computing device that can respond appropriately to touch input. Details regarding an example computing device 900 are described below with reference to FIG. 9.

Figure 2:
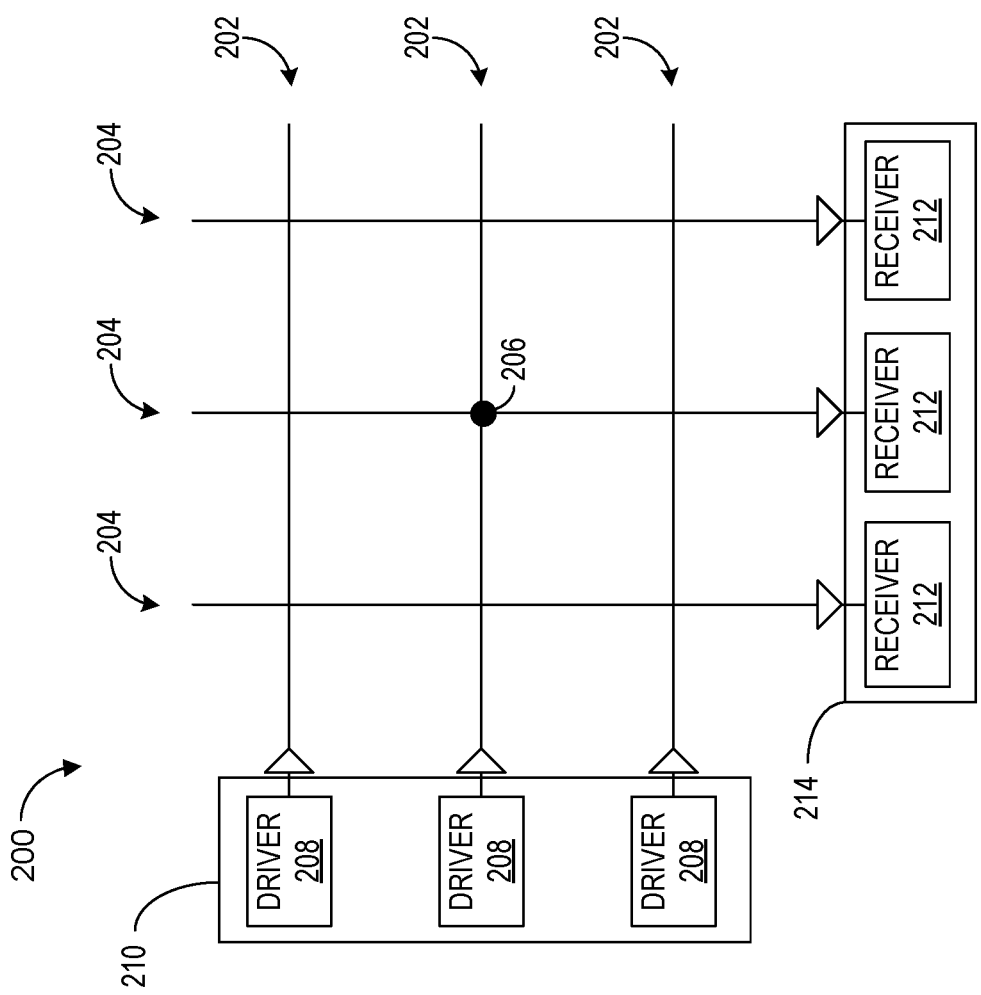
FIG. 2 schematically depicts an example touch sensor matrix.

FIG. 2 shows an example touch sensor matrix 200. It will be understood that matrix 200 is only one possible example of a touch sensor matrix that may enable detection of touch inputs as described herein. Specifically, while matrix 200 includes drivers and receivers configured to influence/interpret electrical conditions on discrete rows/columns of matrix 200, other suitable arrangements are within the scope of this disclosure. For example, an alternative implementation schematically depicted in FIG. 3 includes a plurality of discrete electrodes distributed across the touch sensor and each configured to perform one or both of the transmit and receive functions described below.

Matrix 200 includes a plurality of electrodes in the form of transmit rows 202 and receive columns 204. In various examples, transmit rows 202 and receive columns 204 may be vertically separated, or formed in a single layer. In some cases, this single layer may be disposed within a display panel or glass display backing. In cases where the transmit rows and receive columns are vertically separated, then each vertical intersection may form a corresponding node such as node 206 whose electrical properties (e.g., capacitance) may be measured to detect touch input. Three transmit rows 202 and three receive columns 204 are shown in FIG. 2 for the purpose of clarity, though matrix 200 may include any suitable number of transmit rows and receive columns, which may be on the order of one hundred or one thousand, for example.

While a rectangular grid arrangement is shown in FIG. 2, matrix 200 may assume other geometric arrangements—for example, the matrix may be arranged in a diamond pattern. Alternatively or additionally, individual electrodes in matrix 200 may assume nonlinear geometries—e.g., electrodes may exhibit curved or zigzag geometries, which may minimize the perceptibility of display artifacts (e.g., aliasing, moiré patterns) caused by occlusion of an underlying display by the electrodes. The transmit rows 202 and receive columns 204 may be positioned/oriented according to any suitable layout. For example, transmit rows 202 may be oriented horizontally with respect to ground, vertically with respect to ground, or at another angle. Likewise, receive columns 204 may be oriented horizontally with respect to ground, vertically with respect to ground, or at another angle.

Each transmit row 202 in matrix 200 may be attached to a respective driver 208 configured to drive its corresponding transmit row with a constant or time-varying voltage. In some implementations, drivers 208 of matrix 200 may be driven by a microcoded state machine implemented within a field-programmable gate array (FPGA) forming part of controller 218 of FIG. 2, for example. Such signals are referred to herein as "excitation sequences", as these signals may be time-varying voltages that, when digitally sampled, comprise a sequence of pulses—e.g., one or more samples of a relatively higher digital value followed by one or more samples of a relatively lower digital value, or vice versa.

The drivers 208 may collectively be implemented as drive circuitry 210. Circuitry 210 may be configured to receive commands/inputs from one or more computer components, for example. Further, circuitry 210 may coordinate the activation of each driver 208 to influence/drive electrical conditions on one or more rows/electrodes. For example, circuitry 210 may establish an order in which each driver 208 is driven, as well as determine the signal each driver uses to drive its corresponding row. In some implementations, matrix 200 may be configured to communicate with an active stylus, such as active stylus 400 shown in FIG. 4. This implementation may at least partially enable touch sensitive display device 100 to communicate with input object 104 when matrix 200 is implemented in display device 100. Specifically, an electrostatic channel may be established between one or more transmit rows 202 and a conductive element (e.g., electrode tip) of active stylus 400, along which data may be transmitted.

In one example, communication via the electrostatic channel is initiated by the transmission of a synchronization pattern from matrix 200 to active stylus 400. The synchronization pattern may enable matrix 200 and active stylus 400 to obtain a shared sense of time, and may be transmitted via multiple transmit rows 202 so that active stylus 400 can receive the pattern regardless of its position relative to the matrix. The shared sense of time may facilitate the correlation of a time at which active stylus 400 detects an excitation sequence or other signal transmitted on transmit rows 202 to a location in matrix 200, as the synchronization pattern may yield an indication of the order in which transmit rows 202 are driven. Such correlation may enable active stylus 400 to determine at least one coordinate (e.g., y-coordinate) relative to matrix 200, which may be transmitted back to the matrix (e.g., via the electrostatic channel) or to an associated display device via a different communication protocol (e.g., radio, Bluetooth). To determine a second coordinate (e.g., x-coordinate) of active stylus 400, all transmit rows 202 may be held at a constant voltage, and active stylus 400 may transmit a time-varying voltage to matrix 200, which may sequentially measure currents resulting from a voltage of active stylus 400 in each receive column 204 to ascertain the second coordinate.

Each receive column 204 in matrix 200 may be coupled to a respective receiver 212 configured to receive signals resulting from the transmission of excitation sequences on transmit rows 202. The receivers 212 may be collectively implemented as receive circuitry 214. Circuitry 214 may be configured to process and interpret electrical signals detected by the receivers, with the aim of identifying and localizing touch events performed on matrix 200. During touch detection, matrix 200 may hold all transmit rows 202 at a constant voltage except for one or more active transmit rows along which one or more excitation sequences are transmitted. During transmission of the excitation sequences, all receive columns 204 may be held at a constant voltage (e.g., ground). With the excitation sequences applied to the active transmit rows 202 and all receive columns 204 held at the constant voltage, a current may flow through each of the nodes formed by the vertical intersections of the active transmit rows with the receive columns. Each current may be proportional to the capacitance of its corresponding node. Hence, the capacitance of each node may be measured by measuring each current flowing from the active transmit rows 202. In this way, touch input may be detected by measuring node capacitance.

When other circuitry arrangements are used, other electrical properties/conditions may be measured. For example, in some implementations voltage may be measured instead of or in addition to electrical current. Matrix 200 may be repeatedly scanned at a frame rate (e.g., 60 Hz, 120 Hz) to persistently detect touch input, where a complete scan of a frame comprises applying an excitation sequence to each transmit row 202, and for each driven transmit row, collecting output from all of the receive columns 204. However, in other examples, a complete scan of a frame may be a scan of a desired subset, and not all, of one or both of transmit rows 202 and receive columns 204. As will be described in more detail below, in some cases the subset of the scanned transmit rows and/or receive columns may be determined based on predicted future positions of stylus electrodes of an active stylus.

Throughout the present disclosure, touch-sensitive matrices, such as matrix 200, are generally described as having a plurality of row electrodes and column electrodes, with one or more drivers/receivers coupled to each row/column. However, in some implementations, rather than using drive circuitry 210 and receive circuitry 214 to interpret capacitance in entire rows/columns at once, matrix 200 may be constructed such that each node (e.g., node 206) comprises a separate, independent touch-sensing electrode. Accordingly, each node may be coupled with drive and/or receive circuitry (or other control circuitry/logic) to transmit an excitation sequence to an active stylus and/or receive an excitation sequence transmitted by an active stylus. For example, the described mechanisms can be employed in the context of an in-cell touch sensor in which self-capacitance measurements are used at individual sensels corresponding to specific XY locations on the touch sensor. It will be appreciated that the touch input detection techniques described herein are generally applicable regardless of what type of touch-sensing electrodes are utilized, or how such touch-sensing electrodes are arranged.

Other measurements may be performed on matrix 200 to detect touch, alternatively or additionally to the measurement of capacitance—for example, a time delay between the transmission of an excitation sequence and reception of a received signal resulting from the transmitted excitation sequence, and/or a phase shift between the transmitted excitation sequence and the resulting received signal may be measured.

The above described touch sensor matrix is provided as an example and is meant to be non-limiting. Other touch sensor configurations may be employed without departing from the scope of the present disclosure.

Figure 3:
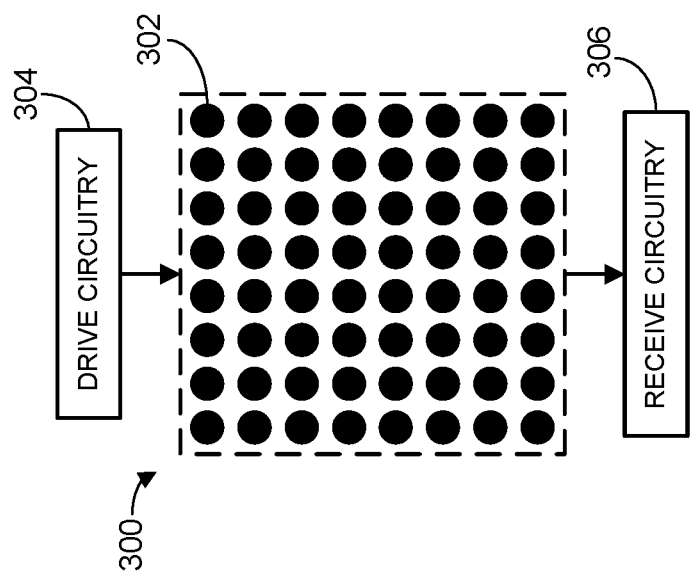
FIG. 3 schematically depicts another example touch sensor matrix.

For example, FIG. 3 schematically depicts another example touch matrix 300. Rather than utilizing vertically separated rows and columns as touch matrix 200 does, matrix 300 employs a plurality of discrete display electrodes 302 arranged in a grid. Each display electrode 302 may be configured to perform any or all of the transmit and receive functions described above. Thus, matrix 300 may be described as an in-cell touch sensor in which self-capacitance measurements are used at individual sensels corresponding to specific XY locations on the touch sensor.

In some cases, each individual display electrode may be coupled with its own dedicated driver/receiver, configured to drive that particular display electrode with an excitation signal and measure electrical conditions at the display electrode. Such drivers and receivers are collectively depicted in FIG. 3 as drive circuitry 304 and receive circuitry 306.

In other cases, however, the touch matrix may include fewer drivers/receivers than there are display electrodes. This may serve to reduce the complexity and expense of the hardware of matrix 300. In an example scenario, the touch matrix may include a set of receivers that collectively can monitor any display electrode in the touch matrix, though can only monitor a portion (e.g., 10%) of the display electrodes at once. Accordingly, scanning of the display electrodes may be time-divided. For example, during a particular touch-sensing time frame (or subframe of a touch-sensing time frame), a particular grouping or band of display electrodes may be scanned to identify touch input. If no touch input is detected within a particular grouping or band, then a different grouping/band is scanned. When touch input is detected, additional scanning may be performed in the identified grouping or band. Such additional scanning may be done, for example, to increase the positional resolution of the detected touch input, and/or to exchange data (e.g., pressure data) with an active stylus.

It will be understood that matrix 300 may share any or all of the touch input detection techniques described above with respect to matrix 200. For example, electrical conditions detected at display electrodes 302 may be correlated with a reference signal associated with driven stylus electrodes. When display electrodes within sufficient proximity to a stylus electrode are correlated with the reference signal, the resulting magnitude will be above a threshold. This threshold may be based on empirical observations based on testing of the hardware—for instance, multiple thresholds may be set to distinguish touch and hover input, different stylus models, etc. Furthermore, matrix 300 may benefit from performing interpolation across multiple display electrodes to improve the granularity with which the position of a given touch input may be detected.

Figure 4:
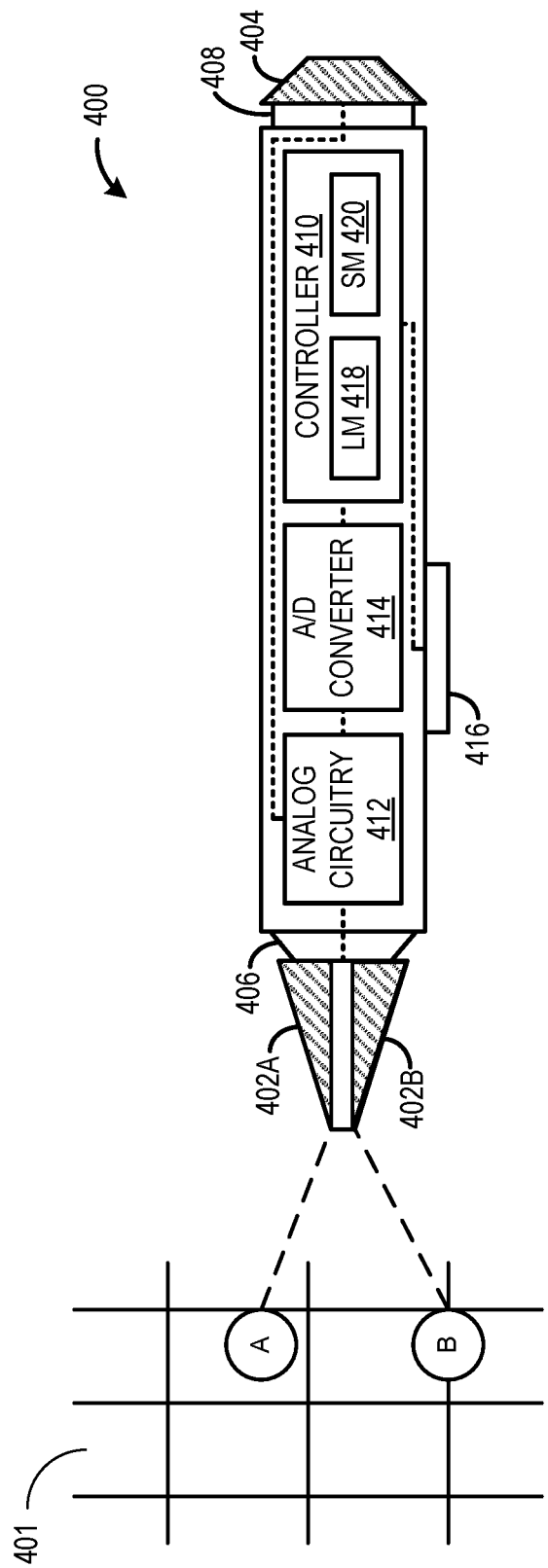
FIG. 4 schematically depicts an example active stylus.

FIG. 4 shows an example active stylus 400 in proximity to a touch matrix 401. Active stylus 400 includes a tip operative end having two stylus electrodes 402A and 402B. Active stylus 400 also includes another stylus electrode 404 on an opposing operative end. In some examples, active stylus 400 may imitate a traditional pencil, with the tip operative end representing a pencil tip, and the opposite operative end representing a pencil eraser. Thus, stylus electrode 404 may be referred to as an electrode eraser, positioned at the eraser end of the stylus. It will be appreciated that the tip and eraser ends of active stylus 400 may each have any suitable number of stylus electrodes, though active styli described herein will generally have at least one operative end with more than one electrode.

The tip electrodes 402 and the electrode eraser 404 may be electrically conductive and configured to receive current when proximate to a driven display electrode of electrode matrix 401. Active stylus 400 may include a pressure sensor 406 configured to detect a pressure when the tip is pressed against a surface. Likewise, eraser 404 may include a pressure sensor 408 configured to detect a pressure when eraser 404 is pressed against a surface. In one example, each of pressure sensors 406 and 408 are force sensitive resistors. A touch pressure value of each of the respective pressure sensors 406 and 408 may be sent to a controller 410. In one example, the touch pressure value may be represented by a 6 bit value.

As shown, tip electrodes 402 and electrode eraser 404 are operatively coupled to analog circuitry 412. Analog circuitry 412 may include linear analog componentry configured to maintain the tip/eraser at a constant voltage and convert any current into or out of the tip/eraser into a proportional current-sense voltage.

An analog-to-digital (A/D) converter 414 is operatively coupled to analog circuitry 412 and configured to digitize voltages received from analog circuitry 412 into digital data to facilitate subsequent processing. As a non-limiting example, converter 414 may convert incoming electrostatic signals having bandwidths of 100 kHz at a sampling rate of 1 Mbit/s.

Active stylus 400 includes a barrel switch button 416 that may be depressable by a user to provide additional user input. A state of button 416 may be sent to controller 410.

The controller 410 includes a logic machine 418 and a storage machine 420 configured to hold instructions executable by logic machine 418 to perform various operations discussed herein. For example, controller 410 may be configured to receive signals from various sensors including pressure sensor 406, pressure sensor 408, and button 416. Further, controller 410 may be configured to process digitized signals from A/D converter 414 to perform other operations discussed herein. In some examples, the logic machine and storage machine of the active stylus may be implemented as logic machine 902 and storage machine 904 described below with respect to FIG. 9.

Depending on the nature of the touch sensor, active stylus 400 may function in various ways. In an example scenario, active stylus 400 may operate in a receive mode and a drive mode. Receive mode may be employed (1) to synchronize active stylus 400 to the computing device/processor associated with the touch-sensor, to establish/maintain a shared sense of time; and (2) to establish the X and/or Y coordinates of active stylus 400 with respect to the touch-sensor matrix. Synchronization typically occurs at the beginning of the touch-sensing time frame, in which one or more display electrodes on the touch-sensor matrix are driven with a synchronization pulse that induce/vary electrical conditions on tip electrodes 402 (or electrode eraser 404) of active stylus 400. The received signal is processed, typically via a correlation operation, in order to establish/maintain the shared sense of timing. Usually, multiple display electrodes spanning at least a portion of the touch-sensor matrix are driven with the synchronization pulse so that active stylus 400 receives an adequate signal regardless of its position relative to the touch-sensor matrix.

Active stylus 400 may also operate in a receive mode during normal scanning of the display electrodes of the touch-sensor matrix. In other words, active stylus 400 may receive signals while the display electrodes are scanned to establish the X and/or Y coordinates of hover/touch on the touch-sensor matrix. The receive circuitry typically runs a correlation operation that is tuned to the drive signal(s) being used on the touch-sensor matrix. Upon receiving a signal of greatest amplitude (e.g., highest correlation), active stylus 400 makes a note of the timing of that highest signal. The recorded timing allows active stylus 400 and display device 100 of touch-sensor matrix 200/300 to know which scanned display electrodes active stylus 400 was closest to, thereby establishing the X and/or Y positions of active stylus 400. In some examples, active stylus 400 reports row or band position information (e.g., timing, value of a counter) to touch-sensor matrix 200/300 over some type of wireless link (e.g., a radio transmitter). Instead of or in addition to a radio link, position information may be transmitted electrostatically via excitation of the tip electrodes 402 (or electrode eraser 404) of active stylus 400.

In some implementations, interpolation may be employed to increase positional resolution. For example, assuming a highest amplitude at a row/band/sensel K, amplitudes may also be noted for rows/bands/sensels K−2, K−1, K+1, K+2. Assessing the amplitudes for these neighboring rows/bands/sensels can enable finer determinations of Y position. Essentially, active stylus 400 "listens" for a communication from display electrodes, and based on the "loudness" of that communication, an assessment is made as to how close active stylus 400 is to the display electrodes that are "talking." By assessing communication volume from a few rows/bands/sensels on either side of the "loudest" row, a higher position granularity may be determined.

In addition or as an alternative to receiving a display excitation signal from display electrodes, active stylus 400 may drive its electrodes (tip or eraser) with a stylus excitation signal. In some cases, each tip electrode 402 may be driven at a different time (e.g., in a different stylus-drive subframe), allowing the position detection of each stylus electrode to be time-divided. Additionally, or alternatively, each stylus electrode may be driven with an excitation signal having a different frequency, modulation, encoding scheme, etc., allowing the stylus electrodes to be distinguished in various ways.

Application of a drive signal to a stylus tip electrode influences/varies electrical conditions on one or more display electrodes of the touch-sensor matrices. Receive circuitry may correlate, as described above, in order to interpret the received signals. In one example, the display column/band/sensel group experiencing the highest signal, or an above-threshold signal, is deduced to be the column/band/sensel group the driven stylus electrode is closest to. As discussed above, the conditions at a clustered grouping of columns/bands/sensels may be used to establish a higher positional resolution.

Upon determining the position of the first electrode, the position of the second electrode may be determined as described above. This is shown in FIG. 4, in which the approximate positions of electrode 402A and 402B are shown relative to matrix 401 as circles "A" and "B." The two detected positions may be averaged and/or otherwise combined in a variety of ways to determine the position of the active stylus. In the specific example of FIG. 4, it may be assumed that the position of the active stylus will be approximately halfway between the positions of the two electrodes. Similar assumptions may be made for other active styli depending on the structures of the other active styli.

It will also be appreciated that signals received by display electrodes when stylus electrodes are driven can be used to disambiguate Y-position of active stylus 400 in a system with two or more touch-sensing matrices. When the stylus electrodes are driven, the stylus excitation signal will likely be detected mostly or entirely at one of the two touch matrixes, thereby alleviating the ambiguity.

Furthermore, during driving of stylus electrodes, active stylus 400 may transmit stylus information to display device 100 via the electrostatic channel formed between an electrode (e.g., tip electrodes 402, eraser 404) of active stylus 400 and the touch-sensor matrix. As discussed above, various operations may be performed to reduce a size of a report that includes such stylus information in order to transmit the report in an efficient and robust manner such that data transmission via the electrostatic communication channel may be reduced.

As described above, using a stylus that includes more than one electrode in a single operative end can enable detection of rotation and/or tilt of the stylus, even when a two-dimensional position of the stylus tip relative to the touch sensor does not change. Additionally, or alternatively, use of multiple stylus electrodes can be used to more efficiently communicate with the display device, for instance allowing an encoded signal to be transmitted with a higher signal-to-noise ratio, or allowing two or more different encoded signals to be transmitted at once.

With regard to detecting stylus position, tilt, and twist, existing devices typically track the different electrodes in a completely independent way—i.e., the capture and processing of tracking information for one electrode is not influenced in any way by tracking/processing for other electrodes. This results, in practical terms, in a tracking regime that assumes no inherent structural or spatial relationship between the stylus electrodes. Accordingly, the touch-sensitive display device may scan a larger subset of display electrodes (e.g., columns and/or rows of a touch-sensor matrix) than is necessary, given that the stylus electrodes are physically coupled to one another. For example, for a given observable set of capacitance measurements (e.g., resulting from proximity of a stylus electrode to a touch matrix), there may be a large set of different possible solutions corresponding to different possible positions and orientations of the active stylus. When the physical relationship between the stylus electrodes is known, this solution set can be reduced by ignoring any possible solutions that are not possible given the known physical constraints of the stylus.

Figure 5:
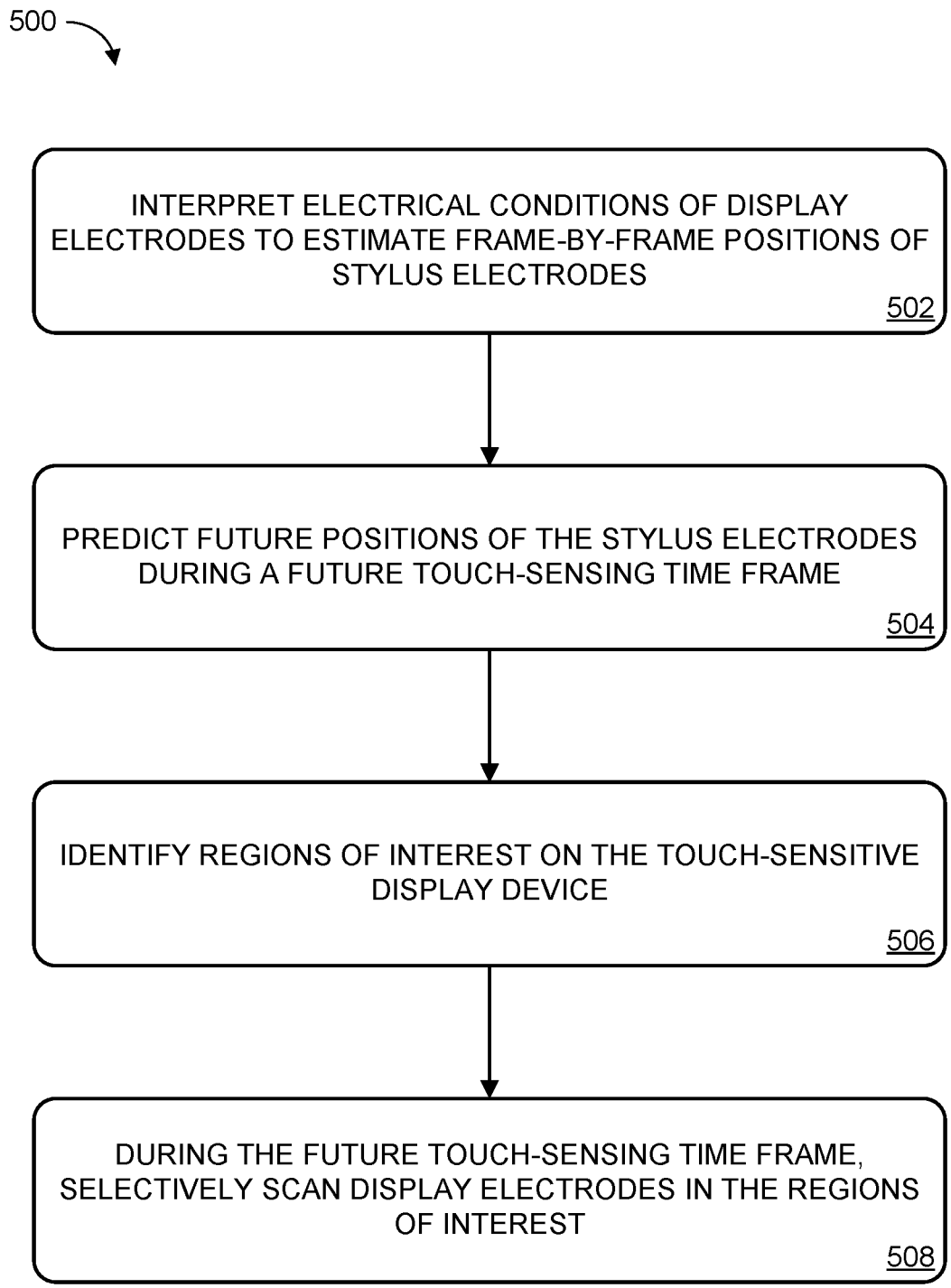
FIG. 5 illustrates an example method for touch input detection.

FIG. 5 illustrates an example method 500 for detecting touch input. According to method 500, the touch-sensitive display device may predict future positions of stylus electrodes of an active stylus, and identify regions of interest including display electrodes surrounding the predicted future positions. The touch-sensitive display device may then selectively scan only the display electrodes found within the regions of interest, thereby conserving both electrical power and processing power of the device, as fewer electrodes are driven with an excitation signal, without compromising accurate detection of touch input.

Method 500 may be implemented using any suitable hardware. In some examples, method 500 may be implemented via device 100 of FIG. 1, touch matrix 200 of FIG. 2, touch matrix 300 of FIG. 3, active stylus 400 of FIG. 4, and/or computing system 900 of FIG. 9.

Figure 6:
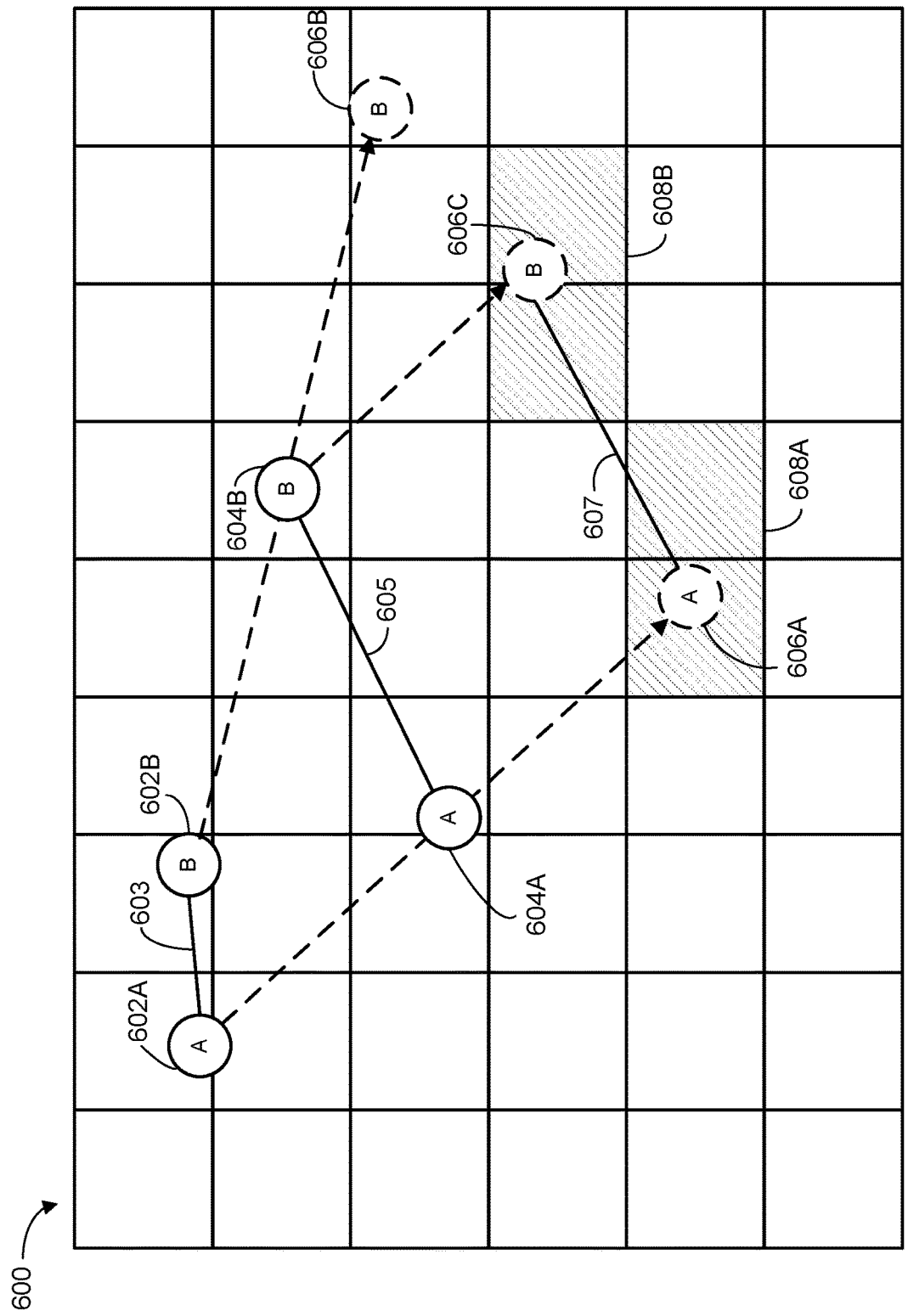
FIG. 6 schematically illustrates selective scanning of regions of interest on a touch-sensitive display device.

At 502, method 500 includes, over a series of touch-sensing time frames, interpreting electrical conditions of display electrodes of a touch-sensitive display to estimate frame-by-frame positions of two or more stylus electrodes relative to the touch-sensitive display device. This is illustrated in FIG. 6, which shows an example touch matrix 600. During a first timeframe, positions of two stylus electrodes are estimated relative to the touch sensor. In FIG. 6, these estimated electrode positions are shown as circles 602A and 602B, which indicate projections or estimates of the positions of the stylus electrodes relative to the two-dimensional surface of the touch-sensitive display. Projected positions 602A and 602B may, for example, correspond to stylus electrodes 402A and 402B of active stylus 400. In practice, proximity of a stylus electrode to a matrix of display electrodes will have a measurable effect on a plurality of display electrodes of the matrix. Thus, the stylus electrode leaves an observable "footprint" on the touch matrix. Using interpolation, the actual position of the stylus electrode can be inferred or projected to be within a small region, or centroid, on the touch matrix.

During a subsequent touch-sensing time frame, the stylus electrodes are detected at projected electrode positions 604A and 604B. Dashed lines are shown connecting these updated projected positions to the previously-projected positions of the stylus electrodes (i.e., positions 602A and 602B), indicating the paths taken by each of the stylus electrodes, and therefore the path taken by the active stylus through physical space. In this manner, the frame-by-frame positions of the stylus electrodes are tracked.

Returning briefly to FIG. 5, at 504, method 500 includes, based on the estimated frame-by-frame positions of the stylus electrodes, predicting future positions of each of the two or more stylus electrodes during a future touch-sensing time frame. FIG. 6 shows predicted future stylus electrode positions at 606A, 606B, and 606C. Specifically, positions 606A and 606B are predicted with the assumption that the stylus electrodes will continue in a straight line given by their previously observed paths. It will be understood that alternate predictions/assumptions may be made if the stylus electrodes are observed to be moving in a different manner (e.g., a curved or otherwise nonlinear path). FIG. 6 also shows a predicted future position 606C, predicted with the assumption that the two stylus electrodes will maintain a fixed physical separation, as will be discussed in more detail below.

Returning briefly to FIG. 5, at 506, method 500 includes identifying regions of interest on the touch-sensitive display device. Each region of interest includes a plurality of display electrodes surrounding the predicted future position of a particular stylus electrode. As shown in FIG. 6, the touch-sensitive display device has identified two different regions of interest 608A and 608B, corresponding to predicted stylus electrode positions 606A and 606C.

Notably, in this example, a region of interest 608B has been identified for predicted stylus electrode position 606C, though not for predicted stylus electrode position 606B. This is because, in some situations, the regions of interest may be identified at least in part on a known physical structure of the active stylus. In other words, as shown in FIG. 4, stylus electrodes 402A and 402B are separated by a fixed distance. Thus, when the positions of these stylus electrodes are estimated relative to the touch-sensitive display, it is unlikely that they will be detected more than a known distance apart from one another. Instead, the estimated positions of the stylus electrodes will have a maximum observed separation when the active stylus is perpendicular to the touch sensitive display. When the active stylus is tilted relative to the display (i.e., the angle formed between the stylus and display is less than 90 degrees), the two stylus electrodes may have an observed separation that is less than the maximum. When the active stylus is sufficiently tilted relative to the display, the observed positions of the stylus electrodes may be partially or entirely overlapping.

Because the stylus electrodes of the active stylus are known to have a certain physical separation, the ability to predict the future positions of stylus electrodes, and therefore identify regions of interest, may be enhanced. This is also shown in FIG. 6. A line 603 is shown between projected electrode positions 602A and 602B, indicating the observed physical separation between the projected positions of the stylus electrodes. In this example, this distance is less than a known physical distance between the actual stylus electrodes. This may occur, for example, when the stylus is tilted at an angle relative to the surface of the touch-sensitive display device, thereby altering the positions at which the stylus electrodes are detected relative to the touch sensor.

A line 605 between projected electrode positions 604A and 604B indicates the new estimated physical separation between the stylus electrodes. In this example, the physical distance indicated by line 605 corresponds to the known physical separation between the stylus electrodes, indicating that the tilt of the active stylus has changed. For example, the active stylus may now be substantially perpendicular to the surface of the touch-sensitive display device, causing the estimated physical separation between stylus electrode position detections to correspond to the actual physical distance between the stylus electrodes.

With regard to the predicted future positions of the stylus electrodes, by observing the physical separation between predicted positions 606A and 606B, the touch-sensitive display device may determine that the distance between these predicted positions is greater than the actual physical distance between the stylus electrodes. Using this knowledge of the known distance between the stylus electrodes, the touch-sensitive display device may then predict future electrode position 606C. Line 607 between predicted positions 606A and 606C of the stylus electrodes is the same length as line 605, indicating that these predicted positions are physically possible given the known structure of the active stylus.

Though only three predicted stylus electrode positions are shown in FIG. 6, it will be understood that the touch-sensitive display device may predict any suitable number of future electrode positions. For example, positions 606A-606C are predicted with the assumption that stylus electrode 402A will continue along its observed path. In other examples, position prediction could be done with the assumption that stylus electrode 402B will continue along its observed path, and a different position could be predicted for stylus electrode 402A. Position prediction for stylus electrodes may additionally or alternatively account for stylus tilt, twist, distance from the touch-sensitive display (e.g., in cases of hover input), etc.

Returning briefly to FIG. 5, at 508, method 500 includes, during the future touch-sensing time frame, selectively scanning display electrodes in the region of interest. In other words, once future stylus electrode positions have been predicted based on predicted electrode paths and/or a known physical separation, display electrodes of the touch-sensitive display device can be selectively scanned. This is indicated in FIG. 6 by regions of interest 608A and 608B surrounding predicted positions 606A and 606C. In some cases, only display electrodes located within regions of interest may be scanned during a given touch-sensing time frame, thereby conserving both electrical power and processing resources of the touch-sensitive display device.

It will be understood that the above process may be repeated during any or all touch-sensing time frames while the touch-sensitive display device is in use. In some cases, during each touch-sensing time frame, the touch-sensitive display device may repeat the above process substantially "from scratch," meaning it predicts new future positions for each stylus electrode and identifies entirely new regions of interest. Additionally, or alternatively, the touch-sensitive display device may be configured to adjust or shift an identified region of interest frame-by-frame to account for movements of a stylus electrode.

Though the above example focused on an active stylus having two stylus electrodes, it will be understood that the techniques described herein may be used with any suitable input object including, for example, styli having only one stylus electrode. In such an example, a region of interest for the stylus electrode may be identified based on a predicted path of the stylus electrode, with or without reference to a known structure of the stylus. In other words, the touch-sensitive display device may estimate frame-by-frame positions for any input object or combination of multiple input objects, including input objects other than the active stylus described above. The frame-by-frame positions for the input object(s) can be used predict a future position of the input object(s), identify regions of interest for the input object(s), and selectively scan display electrodes located within the regions of interest. In various examples, such input objects may include active styli with any suitable number of stylus electrodes, passive styli, human fingers, electrostatic input devices (e.g., user-manipulable dials), etc.

Though the regions of interest of FIG. 6 are shown as being approximately the same shape and size, it will be understood that in other examples regions of interest may have any suitable size and shape. For example, regions of interest may be circular, ellipsoid, rectangular, and/or have any other suitable regular or irregular shapes. Regions of interest predicted for different stylus electrodes need not have the same size or shape. Furthermore, any number of regions of interest may be predicted for a single stylus electrode. For example, in some situations, multiple regions of interest may be predicted for a single stylus electrode depending on different predicted paths, tilts, twists, etc., of the active stylus.

Figure 7:
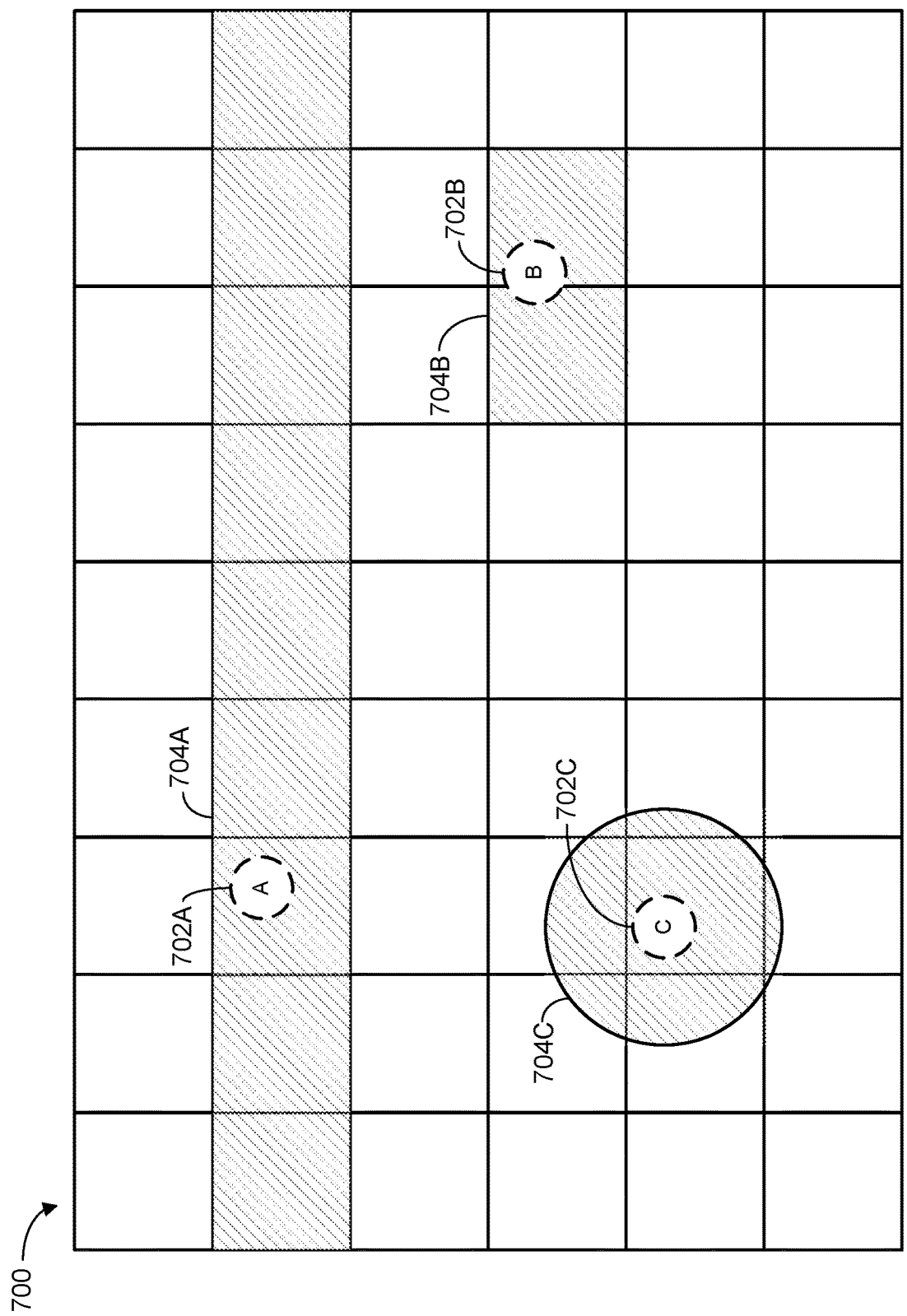
FIG. 7 schematically depicts regions of interest having different shapes.

FIG. 7 shows another example touch matrix 700. Three stylus electrode positions 702A, 702B, and 702C are shown relative to the touch matrix. These positions may be predicted based on frame-by-frame stylus electrode positions as discussed above. In some cases, each of the stylus electrode positions 702A, 702B, and 702C may correspond to different stylus electrodes of the same active stylus, different input objects, the same stylus electrode during different time frames or subframes (e.g., when the stylus is moving rapidly relative to the touch-sensitive display device), etc.

In FIG. 7, each depicted stylus electrode position 702 has a corresponding region of interest 704, which may be identified as discussed above. Each of the regions of interest 704 shown in FIG. 7 has a different shape. Specifically, region of interest 704A is a stripe that includes one or more entire rows of display electrodes of the touch-sensitive display device. Similarly, region of interest 704B is a box centered on the predicted future position of stylus electrode 702B. Region of interest 704C takes the form of a circle enclosing the predicted future position of stylus electrode 702C. It will be understood that the depicted regions of interest are nonlimiting examples, and any suitable shapes and sizes may be used.

As indicated above, "scanning" of display electrodes of a touch-sensitive display device can include driving one or more rows/columns with a display excitation signal detectable by stylus electrodes; applying a display excitation signal to one or more discrete electrodes embedded within/underneath a transparent display; receiving a stylus electrode signal at one or more rows/columns/electrodes induced by presence of a driven stylus electrode; driving display electrodes with an encoded signal for exchanging data with the active stylus; etc. Accordingly, in some examples, two or more regions of interest may be identified for each stylus electrode, the different regions of interest corresponding to different "stages" listed above of the selective scanning process. For example, a given stylus electrode may have a transmit region of interest including display electrodes that are driven with a display excitation signal, and also have a receive region of interest including display electrodes configured to receive or "listen" for a stylus excitation signal. The same stylus electrode may further have a data region of interest including display electrodes driven with an encoded signal for exchanging data with the active stylus.

The various regions of interest identified for a given stylus electrode need not have the same shape or size. To the contrary, in some cases it may be desirable for the transmit, receive, and/or data regions of interest to have different shapes/sizes. This can be done for the sake of reducing processing/electrical power consumption by the touch-sensitive display device, improving a signal-to-noise ratio, reducing interference between multiple display panels, etc. Using the example of FIG. 7, the depicted regions of interest 704 may correspond to transmit, receive, and data regions of interest for a single stylus electrode, predicted for different future touch-sensing time frames or subframes of a touch-sensing time frame.

Figure 8B:
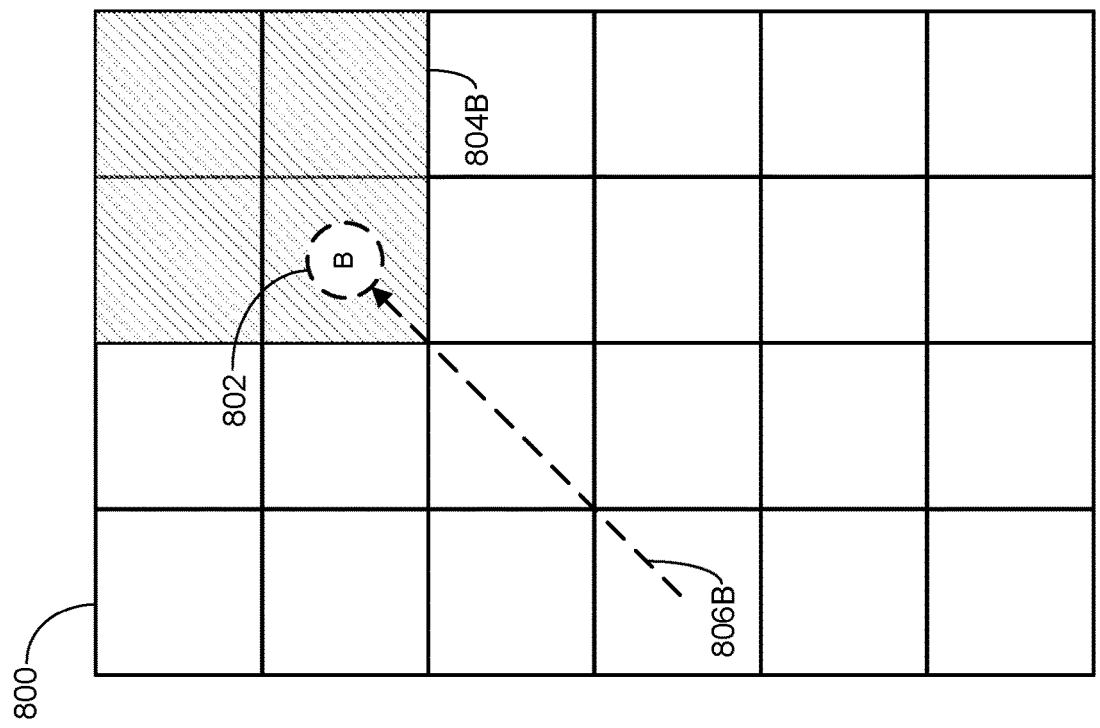
FIGS. 8A-8B schematically illustrate changing the size of a region of interest based on an estimated speed of a stylus electrode.
Figure 8A:
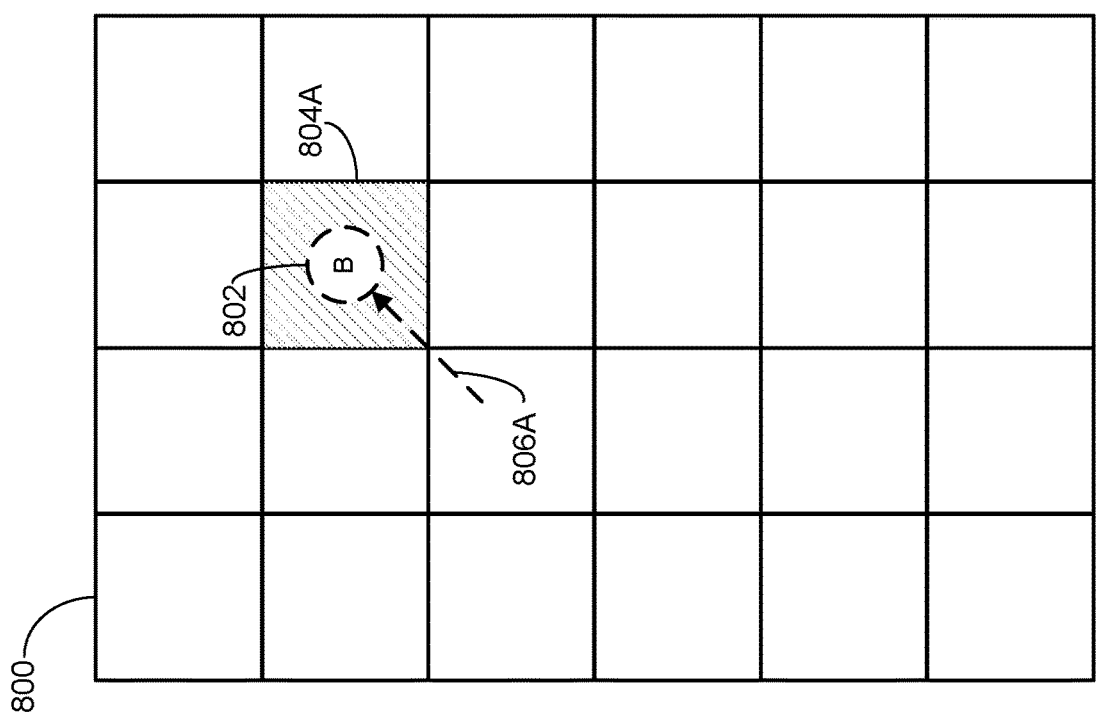

In some examples, the size of a region of interest identified for a given stylus electrode may be dynamically changed frame-by-frame based on various factors. One such factor is the estimated speed at which the stylus electrode is moving. This is illustrated in FIGS. 8A and 8B, each of which schematically show another example touch matrix 800. A predicted future position 802 of a stylus electrode is shown relative to touch matrix 800. In FIG. 8A, the touch-sensitive display device has identified a region of interest 804A for the stylus electrode. The magnitude of the estimated speed of the stylus electrode is given by the size of arrow 806A, which indicates that the stylus electrode is estimated to be moving relatively slowly. Accordingly, the touch-sensitive display device may determine that it can predict the future position of the stylus electrode with relatively high certainty, and identify a relatively small region of interest 804A. In contrast, in FIG. 8B, the stylus electrode is estimated to be moving more quickly, as given by arrow 806B, and the touch-sensitive display device has accordingly identified a larger region of interest 804B. In other words, a size of each region of interest is proportional to an estimated speed of the stylus electrodes.

Though the above description focused on scanning electrodes in the regions of interest while not scanning other electrodes, it will be understood that this need not always be the case. For example, electrodes in the regions of interest may be scanned at a different time, with a different frequency, using a different modulation, etc., as compared to other electrodes of the touch-sensitive display device. Further, in some cases, different regions of interest can be used during different touch-sensing sub-frames, depending on, for example, whether rows/columns, display electrodes, and/or stylus electrodes are being driven, and/or whether information is being transmitted over an electrostatic channel.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
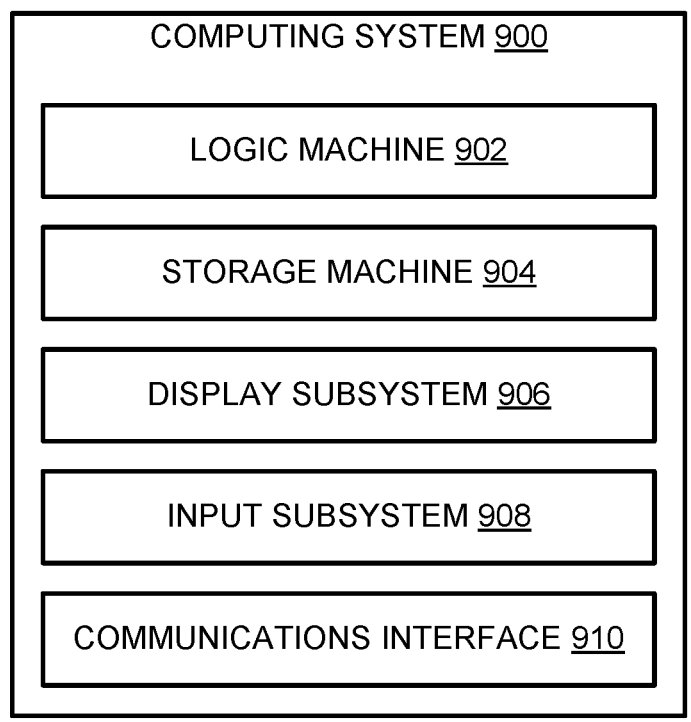
FIG. 9 schematically shows an example computing system.

FIG. 9 schematically shows a non-limiting embodiment of a computing system 900 that can enact one or more of the methods and processes described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices.

Computing system 900 includes a logic machine 902 and a storage machine 904. Computing system 900 may optionally include a display subsystem 906, input subsystem 908, communication subsystem 910, and/or other components not shown in FIG. 9.

Logic machine 902 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 904 includes one or more physical devices configured to hold instructions executable by the logic machine to implement the methods and processes described herein. When such methods and processes are implemented, the state of storage machine 904 may be transformed—e.g., to hold different data.

Storage machine 904 may include removable and/or built-in devices. Storage machine 904 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 904 may include volatile, nonvolatile, dynamic, static, read/write, read-only, random-access, sequential-access, location-addressable, file-addressable, and/or content-addressable devices.

It will be appreciated that storage machine 904 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 902 and storage machine 904 may be integrated together into one or more hardware-logic components. Such hardware-logic components may include field-programmable gate arrays (FPGAs), program- and application-specific integrated circuits (PASIC/ASICs), program- and application-specific standard products (PSSP/

ASSPs), system-on-a-chip (SOC), and complex programmable logic devices (CPLDs), for example.

The terms "module," "program," and "engine" may be used to describe an aspect of computing system 900 implemented to perform a particular function. In some cases, a module, program, or engine may be instantiated via logic machine 902 executing instructions held by storage machine 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 906 may be used to present a visual representation of data held by storage machine 904. This visual representation may take the form of a graphical user interface (GUI). As the herein described methods and processes change the data held by the storage machine, and thus transform the state of the storage machine, the state of display subsystem 906 may likewise be transformed to visually represent changes in the underlying data. Display subsystem 906 may include one or more display devices utilizing virtually any type of technology. Such display devices may be combined with logic machine 902 and/or storage machine 904 in a shared enclosure, or such display devices may be peripheral display devices.

When included, input subsystem 908 may comprise or interface with one or more user-input objects such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 910 may be configured to communicatively couple computing system 900 with one or more other computing devices. Communication subsystem 910 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

In an example, a method for touch input detection comprises: over a series of touch-sensing time frames, interpreting electrical conditions of display electrodes of a touch-sensitive display device to estimate frame-by-frame positions of two or more stylus electrodes of an active stylus relative to the touch-sensitive display device; based on the estimated frame-by-frame positions of the stylus electrodes, predicting future positions of each of the two or more stylus electrodes during a future touch-sensing time frame; identifying regions of interest on the touch-sensitive display device, each region of interest including a plurality of display electrodes surrounding the predicted future position of a stylus electrode of the two or more stylus electrodes; and during the future touch-sensing time frame, selectively scanning display electrodes in the regions of interest. In this example or any other example, the regions of interest are identified based at least in part on a known physical structure of the active stylus. In this example or any other example, the method further comprises estimating frame-by-frame positions of an input object other than the active stylus, predicting a future position of the input object during the future touch-sensing time frame, and identifying a region of interest for the input object. In this example or any other example, the input object is a passive stylus. In this example or any other example, the input object is a human finger. In this example or any other example, the input object is an electrostatic dial. In this example or any other example, each region of interest is a box centered on the predicted future position of a stylus electrode of the two or more stylus electrodes. In this example or any other example, each region of interest is a stripe that includes one or more rows of display electrodes of the touch-sensitive display device. In this example or any other example, a size of each region of interest is proportional to an estimated speed of the two or more stylus electrodes. In this example or any other example, selectively scanning display electrodes in the regions of interest includes driving the display electrodes with a display excitation signal detectable by the stylus electrodes and receiving a stylus excitation signal applied to the stylus electrodes. In this example or any other example, two or more regions of interest are identified for each stylus electrode, including a transmit region of interest including display electrodes that are driven with the display excitation signal, and a receive region of interest including display electrodes that receive the stylus excitation signal. In this example or any other example, the transmit and receive regions of interest have different shapes. In this example or any other example, selectively scanning display electrodes in the regions of interest further includes exchanging data between the touch-sensitive display device and active stylus, and the two or more regions of interest identified for each stylus electrode further include a data region of interest including display electrodes driven to exchange data with the active stylus.

In an example, a touch-sensitive display device comprises: a touch-sensitive display including a plurality of display electrodes; a logic machine; and a storage machine holding instructions executable by the logic machine to: over a series of touch-sensing time frames, interpret electrical conditions of display electrodes of a touch-sensitive display device to estimate frame-by-frame positions of two or more stylus electrodes of an active stylus relative to the touch-sensitive display device; based on the estimated frame-by-frame positions of the stylus electrodes, predict future positions of each of the two or more stylus electrodes during a future touch-sensing time frame; identify regions of interest on the touch-sensitive display device, each region of interest including a plurality of display electrodes surrounding the predicted future position of a stylus electrode of the two or more stylus electrodes; and during the future touch-sensing time frame, selectively scan display electrodes in the regions of interest. In this example or any other example, the regions of interest are identified based on a known physical structure of the active stylus. In this example or any other example, the region of interest is a box centered on the predicted future position of the input object. In this example or any other example, the region of interest is a stripe that includes one or more rows of display electrodes of the touch-sensitive display device. In this example or any other example, the instructions are further executable to estimate frame-by-frame positions of an input object other than the active stylus, predict a future position of the input object during the future touch-sensing time frame, and identify a region of interest for the input object. In this example or any other example, a size of each region of interest is proportional to an estimated speed of the two or more stylus electrodes.

In an example, a method for touch input detection comprises: over a series of touch-sensing time frames, interpreting electrical conditions of display electrodes of a touch-sensitive display device to estimate frame-by-frame positions for each of a plurality of stylus electrodes of an active stylus; based on the estimated frame-by-frame positions of the stylus electrodes, predicting future positions of each stylus electrode during a future touch-sensing time frame; identifying regions of interest on the touch-sensitive display device based on a known physical structure of the active stylus, each region of interest including a plurality of display electrodes surrounding the predicted future position of a stylus electrode of the plurality, and each region of interest having a size proportional to an estimated speed of its corresponding stylus electrode; and during the future touch-sensing time frame, selectively scanning display electrodes in the regions of interest.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for touch input detection, comprising:
over a series of touch-sensing time frames, interpreting electrical conditions of display electrodes of a touch-sensitive display device to estimate frame-by-frame positions of two or more stylus electrodes of an active stylus relative to the touch-sensitive display device, the two or more stylus electrodes having a known spatial separation relative to one another;
based on the estimated frame-by-frame positions of the stylus electrodes and the known spatial separation of the stylus electrodes, predicting future positions of each of the two or more stylus electrodes during a future touch-sensing time frame;
identifying two or more regions of interest on the touch-sensitive display device, each region of interest including a plurality of display electrodes surrounding the predicted future position of a stylus electrode of the two or more stylus electrodes, the two or more regions of interest having a spatial separation derived from the known spatial separation of the two or more stylus electrodes; and
during the future touch-sensing time frame, selectively scanning display electrodes in the regions of interest.

2. The method of claim 1, further comprising estimating frame-by-frame positions of an input object other than the active stylus, predicting a future position of the input object during the future touch-sensing time frame, and identifying a region of interest for the input object.

3. The method of claim 2, where the input object is a passive stylus.

4. The method of claim 2, where the input object is a human finger.

5. The method of claim 2, where the input object is an electrostatic dial.

6. The method of claim 1, where each region of interest is a box centered on the predicted future position of a stylus electrode of the two or more stylus electrodes.

7. The method of claim 1, where each region of interest is a stripe that includes one or more rows of display electrodes of the touch-sensitive display device.

8. The method of claim 1, where a size of each region of interest is proportional to an estimated speed of the two or more stylus electrodes.

9. The method of claim 1, where selectively scanning display electrodes in the regions of interest includes driving the display electrodes with a display excitation signal detectable by the stylus electrodes and receiving a stylus excitation signal applied to the stylus electrodes.

10. The method of claim 9, where two or more regions of interest are identified for each stylus electrode, including a transmit region of interest including display electrodes that are driven with the display excitation signal, and a receive region of interest including display electrodes that receive the stylus excitation signal.

11. The method of claim 10, where the transmit and receive regions of interest have different shapes.

12. The method of claim 10, where selectively scanning display electrodes in the regions of interest further includes exchanging data between the touch-sensitive display device and active stylus, and where the two or more regions of interest identified for each stylus electrode further include a data region of interest including display electrodes driven to exchange data with the active stylus.

13. A touch-sensitive display device, comprising:
a touch-sensitive display including a plurality of display electrodes;
a logic machine; and
a storage machine holding instructions executable by the logic machine to:
over a series of touch-sensing time frames, interpret electrical conditions of display electrodes of a touch-sensitive display device to estimate frame-by-frame positions of two or more stylus electrodes of an active stylus relative to the touch-sensitive display device, the two or more stylus electrodes having a known spatial relation relative to one another;
based on the estimated frame-by-frame positions of the stylus electrodes and the known spatial separation of the stylus electrodes, predict future positions of each of the two or more stylus electrodes during a future touch-sensing time frame;
identify two or more regions of interest on the touch-sensitive display device, each region of interest including a plurality of display electrodes surrounding the predicted future position of a stylus electrode of the two or more stylus electrodes, the two or more regions of interest having a spatial separation derived from the known spatial separation of the two or more stylus electrodes; and during the future touch-sensing time frame, selectively scan display electrodes in the regions of interest.

14. The touch-sensitive display device of claim 13, where each region of interest is a box centered on the predicted future position of a stylus electrode of the two or more stylus electrodes.

15. The touch-sensitive display device of claim 13, where each region of interest is a stripe that includes one or more rows of display electrodes of the touch-sensitive display device.

16. The touch-sensitive display device of claim 13, where the instructions are further executable to estimate frame-by-frame positions of an input object other than the active stylus, predict a future position of the input object during the future touch-sensing time frame, and identify a region of interest for the input object.

17. The touch-sensitive display device of claim 13, where a size of each region of interest is proportional to an estimated speed of the two or more stylus electrodes.

18. A method for touch input detection, comprising:

over a series of touch-sensing time frames, interpreting electrical conditions of display electrodes of a touch-sensitive display device to estimate frame-by-frame positions for each of a plurality of stylus electrodes of an active stylus, the plurality of stylus electrodes having a known spatial separation relative to one another;

based on the estimated frame-by-frame positions of the stylus electrodes and the known spatial separation of the stylus electrodes, predicting future positions of each stylus electrode during a future touch-sensing time frame;

identifying a plurality of regions of interest on the touch-sensitive display device, each region of interest including a plurality of display electrodes surrounding the predicted future position of a stylus electrode of the plurality of stylus electrodes, and each region of interest having a size proportional to an estimated speed of its corresponding stylus electrode, the plurality of regions of interest having a spatial separation derived from the known spatial separation of the plurality of stylus electrodes; and during the future touch-sensing time frame, selectively scanning display electrodes in the regions of interest.

* * * * *